United States Patent Office 2,970,037
Patented Jan. 31, 1961

2,970,037
TRONA PROCESS

Ned A. Caldwell and William C. Bauer, Green River, Wyo., assignors to Food Machinery and Chemical Corporation, New York, N.Y., a corporation of Delaware No Drawing. Filed Nov. 22, 1955, Ser. No. 548,549

4 Claims. (Cl. 23—63)

This invention relates to an improvement in the process for the production of dense ash and/or sodium carbonate monohydrate from crude trona. More particularly, this invention relates to the utilization of withdrawn liquors from the trona process so as to recover the soda value.

Briefly stated, the production of dense ash from crude trona involves the following steps. The ore is dissolved and after the solution is clarified, and the organics are removed by adsorption, the solution is filtered and sent to a set of vacuum crystallizers. Here some of the dissolved material crystallizes out as sodium sesquicarbonate. After dewatering, the sesquicarbonate is calcined to light ash. The light ash is converted into sodium carbonate monohydrate, which is then calcined to dense ash.

That part of the process dealing with the steps necessary to form the sesquicarbonate are more fully described in U.S. Patent No. 2,639,217.

As described in the aforementioned U.S. patent, the continuous preparation of the intermediate sodium sesquicarbonate uses a system of recycling brine containing principally an aqueous solution of sodium carbonate and sodium bicarbonate.

During the processing of the crude trona, appreciable decomposition of sodium bicarbonate occurs with resulting loss of $CO_2$ and formation of sodium carbonate. Some $CO_2$ loss is desired to maintain a certain $Na_2CO_3$—$NaHCO_3$ ratio, but excessive decomposition as is observed in practice upsets the desirable carbonate to bicarbonate ratio in the recycling liquor and causes a lower efficiency in the recovery of sesquicarbonate crystals.

The above referred to U.S. patent describes one way to maintain the proper carbonate to bicarbonate ratio. The patent states that the proper ratio may be maintained by bleeding or removing a certain percentage of the recycling brine in addition to the brine lost by adherence to filter cakes and at the slurry thickener.

Though the withdrawing of a portion of the recycling brine controls the carbonate to bicarbonate ratio, it likewise results in a loss of soda value unless through further processing of the withdrawn liquor the soda value is recovered in some form.

Prior art teachings state that the withdrawn liquor may be carbonated to precipitate most of the soda value present as relatively insoluble sodium bicarbonate. This method of processing the withdrawn liquors is unsatisfactory for two reasons. The equipment necessary to convert the soda value present in the liquors to sodium bicarbonate would be very costly. Secondly, it would be very difficult to find a market for the vast tonnages of sodium bicarbonate that would be produced.

It is therefore an object of this invention to provide a method for making soda ash from crude trona that will be more economical than methods taught by the prior art.

Another object of our invention is to provide a process for the preparation of soda ash from crude trona which will allow the recovery of the soda value present in the liquors withdrawn from the recycling system. Other objects will appear to those skilled in the art as the practice of this invention unfolds.

According to our invention, the liquor that is withdrawn to control the normal carbonate to bicarbonate ratio may be reacted with light ash to convert the same to sodium carbonate monohydrate and the monohydrate may be then calcined to yield dense ash.

The density of soda ash depends on the physical state of aggregation. Old methods of densifying soda ash utilize a high temperature process. Subsequently, it was found that the light ash could be densified by forming the sodium carbonate monohydrate from the light ash. This adsorption of water to form the monohydrate has a shrinking effect on the soda ash so that when the water is driven off a new conglomerate structure remains. To convert the light ash to sodium carbonate monohydrate, water in the amount of about 16% of the total weight of light ash and water is added to the light ash. As stated above we have discovered that substitution of carbonate rich mother liquors for water yields a satisfactory dense ash while at the same time allowing the recovery of the soda value present in the mother liquors.

The mother liquor may be withdrawn from the recycling liquors at any point in the system. In our practice, we prefer to withdraw the liquor from the system after the brine solution has been filtered to remove the sodium sesquicarbonate crystals.

The liquor withdrawn from the recycling brine may contain per hundred parts of water, about 17.5 to about 38 parts of sodium carbonate and from about 1 to about 16 parts of sodium bicarbonate.

The reaction between the light ash and mother liquor may be carried out in an apparatus called a hydrator. For the practice of this invention any conventional hydrator may be employed.

The sodium carbonate monohydrate formed from the light ash-mother liquor reaction may then be calcined in a conventional kiln to yield dense ash or utilized as the monohydrate, itself.

In the practice of this invention, light ash at a temperature between about 140 to 265° C. may be reacted with mother liquor which is at a temperature between about 15° C. to 105° C. to form the sodium carbonate monohydrate. We prefer to admit the light ash and mother liquor to the hydrator at temperatures of about 220°–230° C. and 40°–60° C., respectively.

The reactants, light ash and mother liquor, are added to the hydrator so as to have about a 1:1 mole ratio between the available sodium carbonate and water.

The kiln temperature may vary between about 140° C. to 210° C. We prefer to operate the kiln in the range between about 180°–200° C.

It is not necessary to the practice of this invention that mother liquor be used as such in the formation of the sodium carbonate monohydrate. A portion of the water necessary to form the monohydrate may be derived from the addition of tap water along with the mother liquor.

Further, it is not necessary to employ a separate unit for the monohydrate formation and the dehydration of the monohydrate. It is conceivable that a batch process employing the same unit could be employed.

The following example illustrates the employment of mother liquors withdrawn from the trona process to produce a commercially-acceptable dense ash product.

Example 1

The apparatus used in this example consisted of a hydrator with a volume of 500 cu. ft. and a steam tube drier, 8 feet in diameter and 98 feet long.

The light ash and mother liquor were fed to the hydrator simultaneously. The mother liquor was sprayed onto the rotating light ash at a point near the entry of the light ash to the hydrator.

The light ash and mother liquor were added to the hydrator at the rates of 23 tons per hour of light ash to 2,100 gallons per hour of mother liquor. The temperatures of the incoming light ash and mother liquor were about 245° C. and about 60° C., respectively.

The hydrator was rotated at a speed of about 12 r.p.m.

The average hold up time in the hydrator was about 10 minutes. The temperature of the wet product emerging from the hydrator was about 95° C.

The product emerging from the hydrator was continuously fed to a steam tube drier where the wet product was heated to a temperature of about 190° C. during an average traveling period of 30 minutes in the drier.

The dense ash exiting from the drier had a bulk density of 62.9 lbs. per cu. foot and gave a satisfactory screen analysis for commercial grade dense ash.

Prior to our discovery that liquor containing primarily sodium carbonate and sodium bicarbonate could be used to form the sodium carbonate monohydrate, the monohydrate was formed by reacting light ash with water. It was most surprising to discover that water could be replaced by the aforementioned liquor and still yield an excellent grade of dense ash.

Although prior art teaches that the carbonate to bicarbonate ratio in the preparation of sodium sesquicarbonate may be controlled by withdrawing liquor from the system, the prior art fails to disclose an efficient and economical method of recovering the soda value present in the withdrawn mother liquor. Our invention does provide such an economical and satisfactory method for recovering the soda value present in the withdrawn mother liquors.

Pursuant to the requirements of the patent statutes, the principle of this invention has been explained, and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A cyclic process for the production of dense soda ash from crude trona comprising dissolving the trona in an aqueous solution of sodium carbonate and sodium bicarbonate having a greater concentration of normal carbonate than bicarbonate, crystallizing sodium sesquicarbonate by cooling, separating the sesquicarbonate crystals and the mother liquor solution, discarding a portion of the mother liquor solution to maintain the desired carbonate to bicarbonate ratio, recirculating the remainder of the mother liquor solution to dissolve more trona, calcining the sesquicarbonate crystals to light ash and recovering the sodium values in said discarded mother liquor by reacting a portion of the light ash with a portion of said mother liquor solution to form sodium carbonate monohydrate and calcining the sodium carbonate monohydrate to form dense ash and using only sufficient of said mother liquor to provide water to stoichiometrically react with the available sodium carbonate in said light ash and said mother liquor in a molar ratio of about 1:1 to form sodium carbonate monohydrate by rehydration and to replace the water evaporated in the hydration step.

2. The process of claim 1 in which the light ash is at a temperature between about 220° C. and 265° C. when reacted with the mother liquor.

3. The process of claim 1 in which the light ash is at a temperature between about 140° C. and 265° C. and the mother liquor is at a temperature between about 15° C. and 105° C. when reacted together.

4. The process of claim 1 in which the mother liquor reacted with the light ash contains from about 14.5 to about 38 parts of sodium carbonate and from about 1 to about 16 parts of sodium bicarbonate for each 100 parts of water.

References Cited in the file of this patent

UNITED STATES PATENTS

| | | |
|---|---|---|
| 1,650,244 | Sundstrom | Nov. 22, 1927 |
| 1,907,987 | Lynn | May 9, 1933 |
| 2,005,868 | MacMullin | June 25, 1935 |
| 2,639,217 | Pike | May 19, 1953 |
| 2,670,269 | Rahn | Feb. 23, 1954 |